(12) United States Patent
Mikesell et al.

(10) Patent No.: US 8,214,334 B2
(45) Date of Patent: *Jul. 3, 2012

(54) SYSTEMS AND METHODS FOR DISTRIBUTED SYSTEM SCANNING

(75) Inventors: Paul A. Mikesell, Berkeley, CA (US);
Robert J. Anderson, Seattle, WA (US);
Peter J. Godman, Seattle, WA (US);
Darren P. Schack, Seattle, WA (US);
Nathan E. Dire, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/837,439

(22) Filed: Jul. 15, 2010

(65) Prior Publication Data

US 2011/0016353 A1    Jan. 20, 2011

Related U.S. Application Data

(63) Continuation of application No. 11/255,817, filed on Oct. 21, 2005, now Pat. No. 7,788,303.

(51) Int. Cl.
*G06F 7/00* (2006.01)
*G06F 17/00* (2006.01)
(52) U.S. Cl. ........................ 707/652; 707/674
(58) Field of Classification Search .................. 707/652, 707/999.01, 999.002, 674
See application file for complete search history.

(56) References Cited

U.S. PATENT DOCUMENTS

| | | | |
|---|---|---|---|
| 4,780,796 A | 10/1988 | Fukuda et al. | |
| 5,163,131 A | 11/1992 | Row et al. | |
| 5,181,162 A | 1/1993 | Smith et al. | |
| 5,212,784 A | 5/1993 | Sparks | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,423,046 A | 6/1995 | Nunnelley et al. | |
| 5,459,871 A | 10/1995 | Van Den Berg | |
| 5,481,699 A | 1/1996 | Saether | |
| 5,548,724 A | 8/1996 | Akizawa et al. | |

(Continued)

FOREIGN PATENT DOCUMENTS

EP    0774723    5/1997

(Continued)

OTHER PUBLICATIONS

Nov. 15, 2002 Int'l Search report PCT/US02/24728, 2 pages.

(Continued)

*Primary Examiner* — Alexey Shmatov
(74) *Attorney, Agent, or Firm* — Knobbe Martens Olson & Bear, LLP

(57) ABSTRACT

Systems and methods are provided for scanning files and directories in a distributed file system on a network of nodes. The nodes include metadata with attribute information corresponding to files and directories distributed on the nodes. In one embodiment, the files and directories are scanned by commanding the nodes to search their respective metadata for a selected attribute. At least two of the nodes are capable of searching their respective metadata in parallel. In one embodiment, the distributed file system commands the nodes to search for metadata data structures having location information corresponding to a failed device on the network. The metadata data structures identified in the search may then be used to reconstruct lost data that was stored on the failed device.

12 Claims, 7 Drawing Sheets

U.S. PATENT DOCUMENTS

| | | |
|---|---|---|
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,963,963 A | 10/1999 | Schmuck et al. |
| 5,966,707 A | 10/1999 | Van Huben et al. |
| 5,983,232 A | 11/1999 | Zhang |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,136,176 A | 10/2000 | Wheeler et al. |
| 6,138,126 A | 10/2000 | Hitz et al. |
| 6,154,854 A | 11/2000 | Stallmo |
| 6,169,972 B1 | 1/2001 | Kono et al. |
| 6,173,374 B1 | 1/2001 | Heil et al. |
| 6,202,085 B1 | 3/2001 | Benson et al. |
| 6,209,059 B1 | 3/2001 | Ofer et al. |
| 6,219,693 B1 | 4/2001 | Napolitano et al. |
| 6,226,377 B1 | 5/2001 | Donaghue, Jr. |
| 6,247,108 B1 | 6/2001 | Long |
| 6,279,007 B1 | 8/2001 | Uppala |
| 6,321,345 B1 | 11/2001 | Mann |
| 6,334,168 B1 | 12/2001 | Islam et al. |
| 6,334,966 B1 | 1/2002 | Hahn et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,496,842 B1 | 12/2002 | Lyness |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,668,304 B1 | 12/2003 | Satran et al. |
| 6,671,686 B2 | 12/2003 | Pardon et al. |
| 6,671,704 B1 | 12/2003 | Gondi et al. |
| 6,671,772 B1 | 12/2003 | Cousins |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,871,295 B2 | 3/2005 | Ulrich et al. |
| 6,895,482 B1 | 5/2005 | Blackmon et al. |
| 6,895,534 B2 | 5/2005 | Wong et al. |
| 6,907,011 B1 | 6/2005 | Miller et al. |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,922,708 B1 | 7/2005 | Sedlar |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,010,622 B1 | 3/2006 | Bauer et al. |
| 7,017,003 B2 | 3/2006 | Murotani et al. |
| 7,043,485 B2 | 5/2006 | Manley et al. |
| 7,043,567 B2 | 5/2006 | Trantham |
| 7,058,639 B1 | 6/2006 | Chatterjee et al. |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,165,192 B1 | 1/2007 | Cadieux et al. |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |
| 7,346,346 B2 | 3/2008 | Fachan |
| 7,346,720 B2 | 3/2008 | Fachan |
| 7,370,064 B2 | 5/2008 | Yousefi'zadeh |

| Patent No. | Date | Inventor |
|---|---|---|
| 7,373,426 B2 | 5/2008 | Jinmei et al. |
| 7,386,675 B2 | 6/2008 | Fachan |
| 7,386,697 B1 | 6/2008 | Case et al. |
| 7,440,966 B2 | 10/2008 | Adkins et al. |
| 7,451,341 B2 | 11/2008 | Okaki et al. |
| 7,502,801 B2 | 3/2009 | Sawdon et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,258 B2 | 8/2009 | Wiseman et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,596,713 B2 | 9/2009 | Mani-Meitav et al. |
| 7,617,289 B2 | 11/2009 | Srinivasan et al. |
| 7,631,066 B1 | 12/2009 | Schatz et al. |
| 7,639,818 B2 | 12/2009 | Fujimoto et al. |
| 7,665,123 B1 | 2/2010 | Szor et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,685,162 B2 | 3/2010 | Heider et al. |
| 7,689,597 B1 | 3/2010 | Bingham et al. |
| 7,707,193 B2 | 4/2010 | Zayas et al. |
| 7,716,262 B2 | 5/2010 | Pallapotu |
| 7,734,603 B1 | 6/2010 | McManis |
| 7,739,288 B2 | 6/2010 | Lemar et al. |
| 7,743,033 B2 | 6/2010 | Patel et al. |
| 7,752,226 B1 | 7/2010 | Harmer et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,797,323 B1 | 9/2010 | Eshghi et al. |
| 7,822,932 B2 | 10/2010 | Fachan et al. |
| 7,840,536 B1 | 11/2010 | Ahal et al. |
| 7,844,617 B2 | 11/2010 | Lemar et al. |
| 7,848,261 B2 | 12/2010 | Fachan |
| 7,870,345 B2 | 1/2011 | Issaquah et al. |
| 7,882,068 B2 | 2/2011 | Schack et al. |
| 7,882,071 B2 | 2/2011 | Fachan et al. |
| 7,899,800 B2 | 3/2011 | Fachan et al. |
| 7,900,015 B2 | 3/2011 | Fachan et al. |
| 7,917,474 B2 | 3/2011 | Passey et al. |
| 7,937,421 B2 | 5/2011 | Mikesell et al. |
| 7,949,636 B2 | 5/2011 | Akidau et al. |
| 7,949,692 B2 | 5/2011 | Lemar et al. |
| 7,953,704 B2 | 5/2011 | Anderson et al. |
| 7,953,709 B2 | 5/2011 | Akidau et al. |
| 7,962,779 B2 | 6/2011 | Patel et al. |
| 7,966,289 B2 | 6/2011 | Lu et al. |
| 7,971,021 B2 | 6/2011 | Daud et al. |
| 7,984,324 B2 | 7/2011 | Daud et al. |
| 8,005,865 B2 | 8/2011 | Passey et al. |
| 8,010,493 B2 | 8/2011 | Anderson et al. |
| 8,015,156 B2 | 9/2011 | Anderson et al. |
| 8,015,216 B2 | 9/2011 | Fachan et al. |
| 8,027,984 B2 | 9/2011 | Passey et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0049778 A1 | 4/2002 | Bell et al. |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158861 A1 | 8/2003 | Sawdon et al. |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182312 A1 | 9/2003 | Chen et al. |
| 2003/0182325 A1 | 9/2003 | Manely et al. |
| 2003/0233385 A1 | 12/2003 | Srinivasa et al. |
| 2003/0237019 A1 | 12/2003 | Kleiman et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminksky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |

| | | |
|---|---|---|
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0193389 A1 | 9/2005 | Murphy et al. |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2007/0255921 A1 | 11/2007 | Gole et al. |
| 2007/0288490 A1 | 12/2007 | Longshaw |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168209 A1 | 7/2008 | Davison |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0263549 A1 | 10/2008 | Walker |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0011011 A1 | 1/2010 | Lemar et al. |
| 2010/0016155 A1 | 1/2010 | Fachan |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0022790 A1 | 1/2011 | Fachan |
| 2011/0035412 A1 | 2/2011 | Fachan |
| 2011/0044209 A1 | 2/2011 | Fachan |
| 2011/0060779 A1 | 3/2011 | Lemar et al. |
| 2011/0087635 A1 | 4/2011 | Fachan |
| 2011/0087928 A1 | 4/2011 | Daud et al. |
| 2011/0113211 A1 | 5/2011 | Fachan et al. |
| 2011/0119234 A1 | 5/2011 | Schack et al. |
| 2011/0145195 A1 | 6/2011 | Passey et al. |
| 2011/0153569 A1 | 6/2011 | Fachan et al. |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2006-506741 | 6/2004 |
| JP | 4464279 | 5/2010 |
| JP | 4504677 | 7/2010 |
| WO | WO 94/029796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Oct. 8, 2008 European Supplemental Search Report EP 02 75 6944, 6 pages.
Jan. 23, 2009 Examination Report EP 02 75 6944, 5 pages.
Feb. 22, 2008 Int'l Search report PCT/US07/018326, 20 pages.
May 8, 2008 Int'l Search report PCT/US07/018324, 13 pages.
May 18, 2009 Int'l Search report PCT/US08/059798, 18 pages.
Oct. 22, 2009 Int'l Preliminary Report on Patentability PCT/US08/059798, 10 pages.
Philip A. Bernstein, Vassos Hadzilacos, and Nathan Goodman, Concurrency Control and Recovery in Database Systems, Addison-Wesley, 1987, pp. iii-270.
Kenneth P. Birman, Building Secure and Reliable Network Applications, Manning, 1996, pp. xvi-300.
Kenneth P. Birman, Building Secure and Reliable Network Applications, Manning, 1996, pp. 301-591.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.

Jim Gray and Andreas Reuter, Transaction Processing: Concepts and Techniques, Morgan Kaufmann, 1993, pp. v-290.
Jim Gray and Andreas Reuter, Transaction Processing: Concepts and Techniques, Morgan Kaufmann, 1993, pp. 291-628.
Jim Gray and Andreas Reuter, Transaction Processing: Concepts and Techniques, Morgan Kaufmann, 1993, pp. 630-1070.
Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand col. line 1—p. 447, last line.
Nancy A. Lynch, Distributed Algorithms, Morgan Kaufmann, 1996, pp. 1-395.
Nancy A. Lynch, Distributed Algorithms, Morgan Kaufmann, 1996 pp. 397-872.
Sape Mullender, editor, Distributed Systems (2nd Ed.), ACM Press/ Addison-Wesley Publishing Co., New York, NY, USA, 1993, pp. v-315.
Sape Mullender, editor, Distributed Systems (2nd Ed.), ACM Press/ Addison-Wesley Publishing Co., New York, NY, USA, 1993, pp. 316-595.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. ix-xxv and 2-435.
Gerhard Weikum, et al., Transactional Information Systems: Theory, Algorithms, and the Practice of Concurrency Control and Recovery, Morgan Kaufmann, 2002, pp. 436-853.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Keidar, et al.: Increasing the Resilience of Distributed and Replicated Database Systems (1998) pp. 1-25.
Long, Darrell D.E., et al., *Swift/RAID: A Distributed RAID System, Computing Systems*, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, *Seachange International, Inc.* vs. *nCUBE, Corp.*, Oct. 26, 2004, 28 pages.
United States Court of Appeals, Federal Circuit, *Seachange International, Inc.* vs. *C-Corp, Inc.*, Jun. 29, 2005, 22 pages.
United States District Court, Delaware, *Seachange International, Inc.* vs. *nCUBE, Corp.*, Apr. 7, 2004, 13 pages.
United States District Court, Delaware, *Seachange International, Inc.* vs. *nCUBE, Corp.*, Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.

Todd A. Gerety, Letter to Arthur S. Rose, Jun. 26, 2007 (exhibits listed separately below), 1 page.
Isilon Systems, "Isilon IQ Platform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155-156, 169-173, 178-179, 181-182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96, 98, 100, 143, 141.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347-348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/ web/20050206184604/http://pantz.org/os/ios/ioscommands. shtml>, 12 pages.
IP Forwarding with Cisco Routers Lab Exercises, Jun. 15th 1999 [online], <ws.edu.isoc.org/data1999/1481713642400af6a2de65a/ ip_fwd_cisco_config.ppt>, 11 pages.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached, 23 pages).
Yoshitake Shinkai, Cluster File System: HAMFS, FUJITSU, Japan, Fujitsu Limited, Jul. 9, 1999, vol. 50, No. 4, pp. 210 to 214 (stamped Citation 2 / English Translation attached, 16 pages).
Silaghi, Raul et al.: "Porting OMTTs to CORBA", Lecture Notes in Computer Science, vol. 2888/2003, Nov. 2003, pp. 1521-1542.
Dorai et al.:, "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement for Copy-On-Write Using Virtual Contiguity," Master of Science in Computer Science Thesis, University of California, Santa Cruz, Sep. 2002, 67 pages.

Dec. 18, 2003 Non-Final Rejection in U.S. Appl. No. 10/007,003, filed Nov. 9, 2001.
Mar. 19, 2004 Response to Dec. 18, 2003 Non-Final Rejection in U.S. Appl. No. 10/007,003 filed, Nov. 9, 2001.
Aug. 17, 2004 Final Rejection in U.S. Appl. No. 10/007,003, filed Nov. 9, 2001.
Dec. 20, 2004 Response to Aug. 17, 2004 Final Rejection in U.S. Appl. No. 10/007,003, filed Nov. 9, 2001.
Mar. 24, 2005 Non-Final Rejection in U.S. Appl. No. 10/007,003, filed Nov. 9, 2001.
Jun. 27, 2005 Response to Mar. 24, 2005 Non-Final Rejection in in U.S. Appl. No. 10/007,003, filed Nov. 9, 2001.
Sep. 15, 2005 Final Rejection in U.S. Appl. No. 10/007,003, filed Nov. 9, 2001.
Dec. 15, 2005 Response to Sep. 15, 2005 Final Rejection in U.S. Appl. No. 10/007,003, filed Nov. 9, 2001.
Mar. 7, 2006 Restriction Requirement in U.S. Appl. No. 10/007,003, filed Nov. 9, 2001.
Apr. 6, 2006 Response to Mar. 7, 2006 Restriction Requirement in U.S. Appl. No. 10/007,003, filed Nov. 9, 2001.
Jun. 14, 2006 Final Rejection in U.S. Appl. No. 10/007,003, filed Nov. 9, 2001.
Dec. 18, 2006 Response to Jun. 14, 2006 Final Rejection in U.S. Appl. No. 10/007,003, filed Nov. 9, 2001.
Feb. 15, 2007 Final Rejection in in U.S. Appl. No. 10/007,003, filed Nov. 9, 2001.
Jul. 23, 2007 Response to Feb. 15, 2007 Final Rejection in U.S. Appl. No. 10/007,003, filed Nov. 9, 2001.
Oct. 12, 2007 Non-Final Rejection in U.S. Appl. No. 10/007,003, filed Nov. 9, 2001.
Apr. 14, 2008 Response to Oct. 12, 2007 Non-Final Rejection in U.S. Appl. No. 10/007,003, filed Nov. 9, 2001.
Jul. 14, 2008 Restriction Requirement in U.S. Appl. No. 10/007,003, filed Nov. 9, 2001.
Aug. 14, 2008 Response to Jul. 14, 2008 Restriction Requirement in U.S. Appl. No. 10/007,003, filed Nov. 9, 2001.
Nov. 28, 2008 Final Rejection in U.S. Appl. No. 10/007,003, filed Nov. 9, 2001.
May 28, 2009 Response to Nov. 28, 2008 Final Rejection in U.S. Appl. No. 10/007,003, filed Nov. 9, 2001.
Aug. 11, 2009 Supplemental Response to Nov. 28, 2008 Final Rejection in U.S. Appl. No. 10/007,003, filed Nov. 9, 2001.
Oct. 16, 2009 Notice of Allowance in U.S. Appl. No. 10/007,003, filed Nov. 9, 2001.
May 18, 2004 Restriction Requirement in prosecution of U.S. Pat. No. 7,146,524 issued on Dec. 5, 2006.
Jun. 14, 2004 Response to May 18, 2004 Restriction Requirement in prosecution of U.S. Pat. No. 7,146,524 issued on Dec. 5, 2006.
Aug. 30, 2004 Non-Final Rejection in prosecution of U.S. Pat. No. 7,146,524 issued on Dec. 5, 2006.
Dec. 3, 2004 Response to Aug. 30, 2004 Non-Final Rejection in prosecution of U.S. Pat. No. 7,146,524 issued on Dec. 5, 2006.
Jan. 28, 2005 Final Rejection in prosecution of U.S. Pat. No. 7,146,524 issued on Dec. 5, 2006.
Mar. 28, 2005 Response to Jan. 28, 2005 Final Rejection in prosecution of U.S. Pat. No. 7,146,524 issued on Dec. 5, 2006.
Apr. 11, 2005 Advisory Action in prosecution of U.S. Pat. No. 7,146,524 issued on Dec. 5, 2006.
Apr. 28, 2005 Response to Apr. 11, 2005 Advisory Action in prosecution of U.S. Pat. No. 7,146,524 issued on Dec. 5, 2006.
Jun. 13, 2005 Non-Final Rejection in prosecution of U.S. Pat. No. 7,146,524 issued on Dec. 5, 2006.
Dec. 13, 2005 Response to Jun. 13, 2005 Non-Final Rejection in prosecution of U.S. Pat. No. 7,146,524 issued on Dec. 5, 2006.
Feb. 14, 2006 Final Rejection in prosecution of U.S. Pat. No. 7,146,524 issued on Dec. 5, 2006.
Apr. 13, 2006 Response to Feb. 14, 2006 Final Rejection in prosecution of U.S. Pat. No. 7,146,524 issued on Dec. 5, 2006.
May 9, 2006 Notice of Allowance in prosecution of U.S. Pat. No. 7,146,524 issued on Dec. 5, 2006.
May 9, 2006 Examiner's Amendment in prosecution of U.S. Pat. No. 7,146,524 issued on Dec. 5, 2006.
Jul. 19, 2006 Supplemental Notice of Allowance in prosecution of U.S. Pat. No. 7,146,524 issued on Dec. 5, 2006.
Aug. 9, 2007 Non-Final Rejection in prosecution of U.S. Pat. No. 7,509,524 issued on Mar. 24, 2009.
Feb. 15, 2008 Response to Aug. 9, 2007 Non-Final Rejection in prosecution of U.S. Pat. No. 7,509,524 issued on Mar. 24, 2009.
May 9, 2008 Restriction Requirement in prosecution of U.S. Pat. No. 7,509,524 issued on Mar. 24, 2009.
Oct. 9, 2008 Response to May 9, 2008 Restriction Requirement in prosecution of U.S. Pat. No. 7,509,524 issued on Mar. 24, 2009.
Dec. 19, 2008 Notice of Allowance in prosecution of U.S. Pat. No. 7,509,524 issued on Mar. 24, 2009.
Aug. 17, 2009 Non-Final Rejection in U.S. Appl. No. 11/880,462, filed Jul. 19, 2007.
Mar. 9, 2010 Terminal Disclaimer in U.S. Appl. No. 11/880,462, filed Jul. 19, 2007.
Mar. 9, 2010 Summary of Interview in U.S. Appl. No. 11/880,462, filed Jul. 19, 2007.
Mar. 30, 2010 Comments on Statement of Reasons for Allowance in U.S. Appl. No. 11/880,462, filed Jul. 19, 2007.
Aug. 14, 2006 Non-Final Rejection in U.S. Appl. No. 10/714,326, filed on Nov. 14, 2003.
Nov. 14, 2006 Response to Aug. 14, 2006 Non-Final Rejection in U.S. Appl. No. 10/714,326, filed Nov. 14, 2003.
Feb. 8, 2007 Final Rejection in U.S. Appl. No. 10/714,326, filed Nov. 14, 2003.
May 7, 2007 Response to Feb. 8, 2007 Final Rejection in U.S. Appl. No. 10/714,326, filed Nov. 14, 2003.
Jun. 15, 2007 Non-Final Rejection in U.S. Appl. No. 10/714,326, filed Nov. 14, 2003.
Sep. 19, 2007 Response to Jun. 15, 2007 Non-Final Rejection in U.S. Appl. No. 10/714,326, filed Nov. 14, 2003.
Dec. 6, 2007 Final Rejection in U.S. Appl. No. 10/714,326, filed Nov. 14, 2003.
May 27, 2008 Response to Dec. 6, 2007 Final Rejection in U.S. Appl. No. 10/714,326, filed Nov. 14, 2003.
Aug. 21, 2008 Non-Final Rejection in U.S. Appl. No. 10/714,326, filed Nov. 14, 2003.
Feb. 20, 2009 Response to Aug. 21, 2008 Non-Final Rejection in U.S. Appl. No. 10/714,326, filed Nov. 14, 2003.
Apr. 15, 2009 Supplemental Response to Aug. 21, 2008 Non-Final Rejection in U.S. Appl. No. 10/714,326, filed Nov. 14, 2003.
Jul. 10, 2009 Final Rejection in U.S. Appl. No. 10/714,326, filed Nov. 14, 2003.
Oct. 13, 2009 Response to Jul. 10, 2009 Final Rejection in U.S. Appl. No. 10/714,326, filed Nov. 14, 2003.
Dec. 24, 2009 Office Action in U.S. Appl. No. 10/714,326, filed Nov. 14, 2003.
Mar. 31, 2010 Response to Dec. 24, 2009 Non-Final Rejection in U.S. Appl. No. 10/714,326, filed Nov. 14, 2003.
Jun. 24, 2010 Final Office Action in U.S. Appl. No. 10/714,326, filed Nov. 14, 2003.
Dec. 27, 2010 Notice of Allowance in U.S. Appl. No. 10/714,326, filed Nov. 14, 2003.
Oct. 28, 2008 Response to Jul. 28, 2008 Non-Final Rejection in U.S. Appl. No. 11/262,314, filed Nov. 29, 2005.
Jan. 6, 2009 Final Rejection in U.S. Appl. No. 11/262,314, filed Nov. 29, 2005.
Apr. 3, 2009 Response to Jan. 6, 2009 Final Rejection in U.S. Appl. No. 11/262,314, filed Nov. 29, 2005.
Feb. 4, 2010 Final Office Action in U.S. Appl. No. 11/262,314, filed Nov. 29, 2005.
Aug. 19, 2010 Office Action in U.S. Appl. No. 11/262,308, filed Oct. 28, 2005.
Nov. 14, 2008 Non-Final Rejection in U.S. Appl. No. 11/256,310, filed Jan. 30, 2006.
Dec. 16, 2008 Response to Nov. 14, 2008 Non-Final Rejection in U.S. Appl. No. 11/256,310, filed Jan. 30, 2006.
Mar. 23, 2009 Notice of Allowance in U.S. Appl. No. 11/256,310, filed Jan. 30, 2006.
Jun. 13, 2007 Ex Parte Quayle Action in U.S. Appl. No. 11/255,346, filed Jan. 26, 2006.

Aug. 13, 2007 Response to Jun. 13, 2007 Ex Parte Quayle Action in U.S. Appl. No. 11/255,346, filed Jan. 26, 2006.
Oct. 9, 2007 Notice of Allowance in U.S. Appl. No. 11/255,346, filed Jan. 26, 2006.
Dec. 11, 2007 Non-Final Rejection in U.S. Appl. No. 11/255,818, filed Oct. 21, 2005.
May 12, 2008 Response to Dec. 11, 2007 Non-Final Rejection in U.S. Appl. No. 11/255,818, filed Oct. 21, 2005.
Oct. 2, 2008 Final Rejection in U.S. Appl. No. 11/255,818, filed Oct. 21, 2005.
Apr. 1, 2009 Response to Oct. 2, 2008 Final Rejection in U.S. Appl. No. 11/255,818, filed Oct. 21, 2005.
Jun. 4, 2009 Non-Final Rejection in U.S. Appl. No. 11/255,818, filed Oct. 21, 2005.
Sep. 4, 2009 Response to Jun. 4, 2009 Non-Final Rejection in U.S. Appl. No. 11/255,818, filed Oct. 21, 2005.
Dec. 21, 2009 Final OA in U.S. Appl. No. 11/255,818, filed Oct. 21, 2005.
Jun. 1, 2010 Notice of Allowance in U.S. Appl. No. 11/255,818, filed Oct. 21, 2005.
Aug. 25, 2010 Issue Notification in U.S. Appl. No. 11/255,818, filed Oct. 21, 2005.
Oct. 2, 2007 Non-Final Rejection in U.S. Appl. No. 11/256,317, filed Nov. 28, 2005.
Dec. 20, 2007 Response to Oct. 2, 2007 Non-Final Rejection in U.S. Appl. No. 11/256,317, filed Nov. 28, 2005.
Feb. 8, 2008 Notice of Allowance in U.S. Appl. No. 11/256,317, filed Nov. 28, 2005.
Jan. 17, 2008 Non-Final Rejection in U.S. Appl. No. 11/255,337, filed Jan. 25, 2006.
May 20, 2008 Response to Jan. 17, 2008 Non-Final Rejection in U.S. Appl. No. 11/255,337, filed Jan. 25, 2006.
Oct. 21, 2008 Final Rejection in U.S. Appl. No. 11/255,337, filed Jan. 25, 2006.
Apr. 20, 2009 Response to Oct. 21, 2008 Final Rejection in U.S. Appl. No. 11/255,337, filed Jan. 25, 2006.
Jul. 24, 09 Non-Final OA in U.S. Appl. No. 11/255,337, filed Jan. 25, 2006.
Oct. 26, 2009 Amendment to Jul. 24, 2009 Non-Final OA in U.S. Appl. No. 11/255,337, filed Jan. 25, 2006.
Mar. 29, 2010 Final OA in U.S. Appl. No. 11/255,337, filed Jan. 25, 2006.
Jul. 29, 2010 Response to Final Office Action dated Mar. 29, 2010 submitted with Request for Continued Examiation in U.S. Appl. No. 11/255,337, filed Jan. 25, 2006.
Sep. 13, 2010 Notice of Allowance in U.S. Appl. No. 11/255,337, filed Jan. 25, 2006.
Apr. 10, 2008 Non-Final Rejection in U.S. Appl. No. 11/396,282, filed Mar. 31, 2006.
Oct. 9, 2008 Response to Apr. 10, 2008 Non-Final Rejection in U.S. Appl. No. 11/396,282, filed Mar. 31, 2006.
Jan. 9, 2008 Final Rejection in U.S. Appl. No. 11/396,282, filed Mar. 31, 2006.
Apr. 8, 2009 Response to Jan. 9, 2008 Final Rejection in U.S. Appl. No. 11/396,282, filed Mar. 31, 2006.
May 21, 2009 Office Action in U.S. Appl. No. 11/396,282, filed Mar. 31, 2006.
Aug. 21, 2009 Response to May 21, 2009 Office Action in U.S. Appl. No. 11/396,282, filed Mar. 31, 2006.
Mar. 10, 2010 Notice of Allowance in U.S. Appl. No. 11/396,282, filed Mar. 31, 2006.
Jun. 23, 2010 Issue Notification in U.S. Appl. No. 11/396,282, filed Mar. 31, 2006.
Nov. 16, 2010 Office Action in U. S. Appl. No. 12/789, 393, filed May 27, 2010.
Oct. 20, 2008 Response to Jul. 18, 2008 Non-Final Rejection in U.S. Appl. No. 11/507,075, filed Aug. 18, 2006.
Dec. 24, 2008 Final Rejection in U.S. Appl. No. 11/507,075, filed Aug. 18, 2006.
Apr. 22, 2009 Response to Dec. 24, 2008 Final Rejection in U.S. Appl. No. 11/507,075, filed Aug. 18, 2006.
Aug. 27, 2009 Issue Notification in U.S. Appl. No. 11/507,075, filed Aug. 18, 2006.
Jun. 17, 2008 Non-Final Rejection in U.S. Appl. No. 11/507,070, filed Aug. 18, 2006.
Oct. 16, 2008 Response to Jun. 17, 2008 Non-Final Rejection in U.S. Appl. No. 11/507,070, filed Aug. 18, 2006.
Jan. 22, 2009 Final Rejection in U.S. Appl. No. 11/507,070, filed Aug. 18, 2006.
Aug. 6, 2009 Non-Final Rejection in U.S. Appl. No. 11/507,070, filed Aug. 18, 2006.
Apr. 5, 2010 Final Office Action in U.S. Appl. No. 11/507,070, filed Aug. 18, 2006.
Jun. 18, 2010 Notice of Allowance in U.S. Appl. No. 11/507,070, filed Aug. 18, 2006.
Oct. 6, 2010 Issue Notification in U.S. Appl. No. 11/507,070, filed Aug. 18, 2006.
Jun. 27, 2008 Non-Final Rejection in U.S. Appl. No. 11/507,076, filed Aug. 18, 2006.
Oct. 27, 2008 Response to Jun. 27, 2008 Non-Final Rejection in U.S. Appl. No. 11/507,076, filed Aug. 18, 2006.
Jan. 23, 2009 Final Rejection in U.S. Appl. No. 11/507,076, filed Aug. 18, 2006.
May 22, 2009 Response to Jan. 23, 2009 Final Rejection in U.S. Appl. No. 11/507,076, filed Aug. 18, 2006.
Jun. 26, 2009 Rejection in U.S. Appl. No. 11/507,076, filed Aug. 18, 2006.
Sep. 28, 2009 Response to Jun. 26, 2009 Rejection in U.S. Appl. No. 11/507,076, filed Aug. 18, 2006.
Jan. 26, 2010 Notice of Allowance in U.S. Appl. No. 11/507,076, filed Aug. 18, 2006.
Apr. 21, 2010 Response to 312 Amendment in U.S. Appl. No. 11/507,076, filed Aug. 18, 2006.
May 26, 2010 Notice of Allowance in U.S. Appl. No. 11/507,076, filed Aug. 18, 2006.
Jun. 16, 2010 Issue Notification in U.S. Appl. No. 11/507,076, filed Aug. 18, 2006.
May 3, 2011 Issue Notification in U.S. Appl. No. 10/714,326, filed Nov. 14, 2003.
Nov. 19, 2010 Amendment in U.S. Appl. No. 11/262,308, filed Oct. 28, 2005.
Jan. 27, 2011 Final Office Action in U.S. Appl. No. 11/262,308, filed Oct. 28, 2005.
Dec. 21, 2010 Office Action in U.S. Appl. No. 12/484,905, filed Jun. 15, 2009.
Feb. 22, 2011 Supplemental Notice of Allowance in U.S. Appl. No. 11/255,337, filed Oct. 21, 2005.
Mar. 10, 2011 issue Notification in U.S. Appl. No. 11/255,337, filed Oct. 21, 2005.
Apr. 8, 2011 Interview Summary in U.S. Appl. No. 12/789/393, filed May 27, 2010.
Apr. 15, 2011 Notice of Allowance in U.S. Appl. No. 12/789,393, filed May 27, 2010.
Aug. 26, 2009 Non-Final Rejection in U.S. Appl. No. 11/497,806, filed Aug. 2, 2006.
Mar. 18, 2010 Final Office Action in U.S. Appl. No. 11/497,806, filed Aug. 2, 2006.
Jul. 18, 2008 Non-Final Rejection in U.S. Appl. No. 11/507,075, filed Aug. 18, 2006.
Jan. 12, 2011 Office Action in U.S. Appl. No. 12,554,752, filed Sep. 4, 2009.
Apr. 14, 2011 Interview Summary in U.S. Appl. No. 12/554,752, filed Sep. 4, 2004.
Nov. 6, 2009 Amendment in U.S. Appl. No. 11/507,070, filed Aug. 18, 2006.
Jun. 4, 2010 Amendment After Final in U.S. Appl. No. 11/507,070, filed Aug. 18, 2006.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Sape Mullender, editor, Distributed Systems (2nd Ed.), ACM Press/ Addison-Wesley Publishing Co., New York, NY, USA, 1993, pp. 1-327.

Sape Mullender, editor, Distributed Systems (2nd Ed.), ACM Press/Addison-Wesley Publishing Co., New York, NY, USA, 1993, pp. 328-604.

Gerhard Weikum, et al., Transactional Information Systems: Theory, Algorithms, and the Practice of Concurrency Control and Recovery, Morgan Kaufmann, 2002, pp. 1-450.

Gerhard Weikum, et al., Transactional Information Systems: Theory, Algorithms, and the Practice of Concurrency Control and Recovery, Morgan Kaufmann, 2002, pp. 451-863.

Duchamp, Dan: "Analysis of Transaction Management Performance", ACM Symposium on Operating Systems Principles, Dec. 1989, pp. 177-190.

HP, Slow Internal Disk, Feb. 22, 2005, p. 2 and 6, in 7 pages.

Shen, et al., Distributed and Dynamic Task Reallocation in Robot Organizations; IEEE 2002, pp. 1019-1024.

Apr. 28, 2011 Interview Summary in U.S. Appl. No. 11/262,308, filed Oct. 28, 2005.

Aug. 4, 2011 Notice of Allowance in U.S. Appl. No. 11/262,308.

Aug. 11, 2011 Non-Final Office Action in U.S. Appl. No. 12/965,748, filed Dec. 10, 2010.

Aug. 3, 2011 Issue Notification in U.S. Appl. No. 12/789,393, filed May 27, 2010.

May 19, 2011 Notice of Allowance in U.S. Appl. No. 12/554,752, filed Sep. 4, 2009.

FIG. 2B

DEVICE A

INODE MAP

| 0   | 1   | 2   | 3   |
|-----|-----|-----|-----|
| 1   | 0   | 1   | 0   |
| 4   | 5   | 6   | 7   |
| 1   | 1   | 1   | 0   |
| 8   | 9   | 10  | 11  |
| 0   | 0   | 0   | 0   |
| 12  | 13  | 14  | 15  |
| ... | ... | ... | ... |

INODE STORAGE

| 0 INODE dir1 | 1 | 2 INODE file2.xyz | 3 |
|---|---|---|---|
| 4 INODE dir6 | 5 INODE file1.zzz | 6 INODE file3.xxx | 7 |
| 8 | 9 | 10 | 11 |
| 12 ... | 13 ... | 14 ... | 15 ... |

SYSTEMS AND METHODS FOR DISTRIBUTED SYSTEM SCANNING

REFERENCE TO AND CROSS-REFERENCE TO RELATED APPLICATIONS

The present application is a continuation of U.S. patent application Ser. No. 11/255,817, filed Oct. 21, 2005, entitled "SYSTEMS AND METHODS FOR DISTRIBUTED SYSTEM SCANNING." The present disclosure relates to U.S. patent application Ser. No. 11/256,410, titled "SYSTEMS AND METHODS FOR PROVIDING VARIABLE PROTECTION," U.S. patent application Ser. No. 11/255,346, titled "SYSTEMS AND METHODS FOR MANAGING CONCURRENT ACCESS REQUESTS TO A SHARED RESOURCE," U.S. patent application Ser. No. 11/255,818, titled "SYSTEMS AND METHODS FOR MAINTAINING DISTRIBUTED DATA," U.S. patent application Ser. No. 11/256,317, titled "SYSTEMS AND METHODS FOR USING EXCITEMENT VALUES TO PREDICT FUTURE ACCESS TO RESOURCES," and U.S. patent application Ser. No. 11/255,337 titled "SYSTEMS AND METHODS FOR ACCESSING AND UPDATING DISTRIBUTED DATA," each filed on Oct. 21, 2005 and each hereby incorporated by reference herein in their entirety.

FIELD OF THE INVENTION

This disclosure relates to systems and methods for scanning files in distributed file systems.

BACKGROUND

Operating systems generally manage and store information on one or more memory devices using a file system that organizes data in a file tree. File trees identify relationships between directories, subdirectories, and files.

In a distributed file system, data is stored among a plurality of network nodes. Files and directories are stored on individual nodes in the network and combined to create a file tree for the distributed file system to identify relationships and the location of information in directories, subdirectories and files distributed among the nodes in the network. Files in distributed file systems are typically accessed by traversing the overall file tree.

Occasionally, a file system may scan a portion or all of the files in the file system. For example, the file system or a user may want to search for files created or modified in a certain range of dates and/or times, files that have not been accessed for a certain period of time, files that are of a certain type, files that are a certain size, files with data stored on a particular memory device (e.g., a failed memory device), files that have other particular attributes, or combinations of the foregoing. Scanning for files by traversing multiple file tree paths in parallel is difficult because the tree may be very wide or very deep. Thus, file systems generally scan for files by sequentially traversing the file tree. However, file systems, and particularly distributed file systems, can be large enough to store hundreds of thousands of files, or more. Thus, it can take a considerable amount of time for the file system to sequentially traverse the entire file tree.

Further, sequentially traversing the file tree wastes valuable system resources, such as the availability of central processing units to execute commands or bandwidth to send messages between nodes in a network. System resources are wasted, for example, by accessing structures stored throughout a cluster from one location, which may require significant communication between the nodes and scattered access to memory devices. The performance characteristics of disk drives, for example, vary considerably based on the access pattern. Thus, scattered access to a disk drive based on sequentially traversing a file tree can significantly increase the amount of time used to scan the file system.

SUMMARY

Thus, it would be advantageous to use techniques and systems for scanning file systems by searching metadata, in parallel, for selected attributes associated with a plurality of files. In one embodiment, content data, parity data and metadata for directories and files are distributed across a plurality of network nodes. When performing a scan of the distributed file system, two or more nodes in the network search their respective metadata in parallel for the selected attribute. When a node finds metadata corresponding to the selected attribute, the node provides a unique identifier for the metadata to the distributed file system.

According to the foregoing, in one embodiment, a method is provided for scanning files and directories in a distributed file system on a network. The distributed file system has a plurality of nodes. At least a portion of the nodes include metadata with attribute information for one or more files striped across the distributed file system. The method includes commanding at least a subset of the nodes to search their respective metadata for a selected attribute and to perform an action in response to identifying the selected attribute in their respective metadata. The subset of nodes is capable of searching their respective metadata in parallel.

In one embodiment, a distributed file system includes a plurality of nodes configured to store data blocks corresponding to files striped across the plurality of nodes. The distributed file system also includes metadata data structures stored on at least a portion of the plurality of nodes. The metadata data structures include attribute information for the files. At least two of the plurality of nodes are configured to search, at substantially the same time, their respective metadata data structures for a selected attribute.

In one embodiment, a method for recovering from a failure in a distributed file system includes storing metadata corresponding to one or more files on one or more nodes in a network. The metadata points to data blocks stored on the one or more nodes. The method also includes detecting a failed device in the distributed file system, commanding the nodes to search their respective metadata for location information corresponding to the failed device, receiving responses from the nodes, the responses identifying metadata data structures corresponding to information stored on the failed device, and accessing the identified metadata data structures to reconstruct the information stored on the failed device.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Systems and methods that embody the various features of the invention will now be described with reference to the following drawings.

FIG. 2B illustrates an inode map and an inode storage on Device A in according with FIG. 2A according to one embodiment.

DETAILED DESCRIPTION OF PREFERRED EMBODIMENTS

Figure 1:
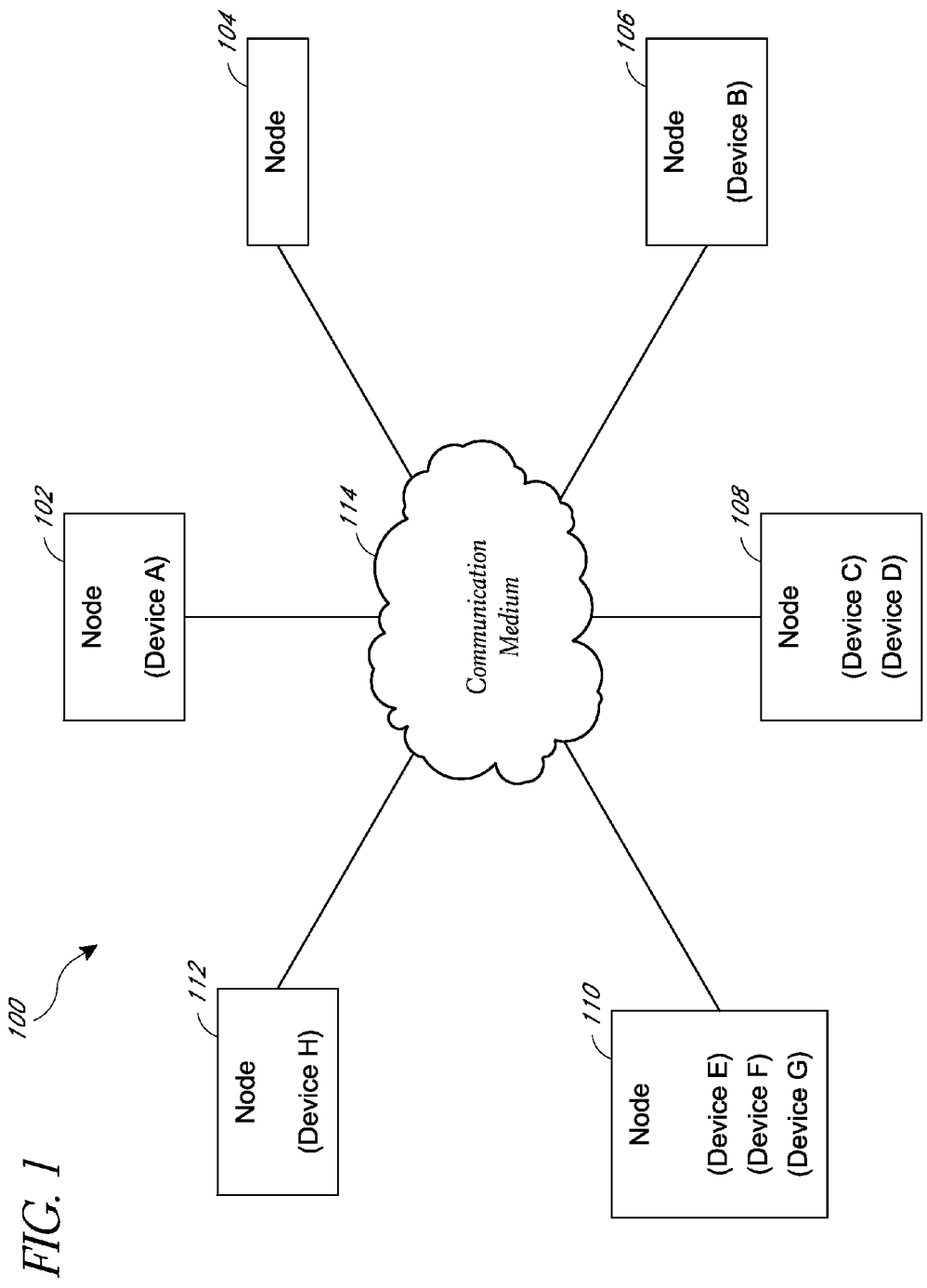
FIG. 1 illustrates an exemplary block diagram of a network according to one embodiment.

Systems and methods which represent one embodiment and example application of the invention will now be described with reference to the drawings. Variations to the systems and methods which represent other embodiments will also be described.

For purposes of illustration, some embodiments will be described in the context of a distributed file system. The inventors contemplate that the present invention is not limited by the type of environment in which the systems and methods are used, and that the systems and methods may be used in other environments, such as, for example, the Internet, the World Wide Web, a private network for a hospital, a broadcast network for a government agency, an internal network of a corporate enterprise, an intranet, a local area network, a wide area network, and so forth. The figures and descriptions, however, relate to an embodiment of the invention wherein the environment is that of distributed file systems. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

I. Overview

Rather than sequentially traversing a file tree searching for a particular attribute during a scan, a distributed file system, according to one embodiment, commands a plurality of network nodes to search their respective metadata for the particular attribute. The metadata includes, for example, attributes and locations of file content data blocks, metadata data blocks, and protection data blocks (e.g., parity data blocks and mirrored data blocks). Thus, two or more nodes in the network can search for files having the particular attribute at the same time.

In one embodiment, when a node finds metadata corresponding to the selected attribute, the node provides a unique identifier for a corresponding metadata data structure to the distributed file system. The metadata data structure includes, among other information, the location of or pointers to file content data blocks, metadata data blocks, and protection data blocks for corresponding files and directories. The distributed file system can then use the identified metadata data structure to perform one or more operations on the files or directories. For example, the distributed file system can read an identified file, write to an identified file, copy an identified file or directory, move an identified file to another directory, delete an identified file or directory, create a new directory, update the metadata corresponding to an identified file or directory, recover lost or missing data, and/or restripe files across the distributed file system. In other embodiments, these or other file system operations can be performed by the node or nodes that find metadata corresponding to the selected attribute.

In one embodiment, the distributed file system commands the nodes to search for metadata data structures having location information corresponding to a failed device on the network. The metadata data structures identified in the search may then be used to reconstruct lost data that was stored on the failed device.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

II. Distributed File System

FIG. 1 is an exemplary block diagram of a network 100 according to one embodiment of the invention. The network 100 comprises a plurality of nodes 102, 104, 106, 108, 110, 112 configured to communicate with each other through a communication medium 114. The communication medium 114 comprises, for example, the Internet or other global network, an intranet, a wide area network (WAN), a local area network (LAN), a high-speed network medium such as Infiniband, dedicated communication lines, telephone networks, wireless data transmission systems, two-way cable systems or customized computer interconnections including computers and network devices such as servers, routers, switches, memory storage units, or the like.

In one embodiment, at least one of the nodes 102, 104, 106, 108, 110, 112 comprises a conventional computer or any device capable of communicating with the network 114 including, for example, a computer workstation, a LAN, a kiosk, a point-of-sale device, a personal digital assistant, an interactive wireless communication device, an interactive television, a transponder, or the like. The nodes 102, 104, 106, 108, 110, 112 are configured to communicate with each other by, for example, transmitting messages, receiving messages, redistributing messages, executing received messages, providing responses to messages, combinations of the foregoing, or the like. In one embodiment, the nodes 102, 104, 106, 108, 110, 112 are configured to communicate RPC messages between each other over the communication medium 114 using TCP. An artisan will recognize from the disclosure herein, however, that other message or transmission protocols can be used.

In one embodiment, the network 100 comprises a distributed file system as described in U.S. patent application Ser. No. 10/007,003, entitled "System and Method for Providing a Distributed File System Utilizing Metadata to Track Information About Data Stored Throughout the System," filed Nov. 9, 2001 which claims priority to Application No. 60/309,803 filed Aug. 3, 2001, and U.S. patent application Ser. No. 10/714,326, filed Nov. 14, 2003, which claims priority to Application No. 60/426,464, filed Nov. 14, 2002, all of which are hereby incorporated by reference herein in their entirety. For example, the network 100 may comprise an intelligent distributed file system that enables the storing of file data among a set of smart storage units which are accessed as a single file system and utilizes a metadata data structure to track and manage detailed information about each file. In one embodiment, individual files in a file system are assigned a unique identification number that acts as a pointer to where the system can find information about the file. Directories (and subdirectories) are files that list the name and unique identification number of files and subdirectories within the directory. Thus, directories are also assigned unique identification numbers that reference to where the system can find information about the directory.

In addition, the distributed file system may be configured to write data blocks or restripe files distributed among a set of smart storage units in the distributed file system wherein data is protected and recoverable if a system failure occurs.

In one embodiment, at least some of the nodes 102, 104, 106, 108, 110, 112 include one or more memory devices for storing file content data, metadata, parity data, directory and subdirectory data, and other system information. For example, as shown in FIG. 1, the node 102 includes device A, the node 106 includes device B, the node 108 includes devices C and D, the node 110 includes devices E, F, and G, and the node 112 includes device H. Advantageously, the file content data, metadata, parity data, and directory data (including, for example, subdirectory data) are distributed among at least a portion of the devices A-G such that information will not be permanently lost if one of the nodes 102, 104, 106, 108, 110, 112 and/or devices A-G fails. For example, the file content data, metadata, parity data, and/or directory data may be mirrored on two or more devices A-G or protected using a parity scheme (e.g., 2+1, 3+1, or the like).

A. Metadata

Metadata data structures include, for example, the device and block locations of the file's data blocks to permit different levels of replication and/or redundancy within a single file system, to facilitate the change of redundancy parameters, to provide high-level protection for metadata distributed throughout the network 100, and to replicate and move data in real-time. Metadata for a file may include, for example, an identifier for the file, the location of or pointer to the file's data blocks as well as the type of protection for each file, or each block of the file, the location of the file's protection blocks (e.g., parity data, or mirrored data). Metadata for a directory may include, for example, an identifier for the directory, a listing of the files and subdirectories of the directory as well as the identifier for each of the files and subdirectories, as well as the type of protection for each file and subdirectory. In other embodiments, the metadata may also include the location of the directory's protection blocks (e.g., parity data, or mirrored data). In one embodiment, the metadata data structures are stored in the distributed file system.

B. Attributes

In one embodiment, the metadata includes attribute information corresponding to files and directories stored on the network 100. The attribute information may include, for example, file size, file name, file type, file extension, file creation time (e.g., time and date), file access time (e.g., time and date), file modification date (e.g., time and date), file version, file permission, file parity scheme, file location, combinations of the foregoing, or the like. The file location may include, for example, information useful for accessing the physical location in the network of content data blocks, metadata data blocks, parity data blocks, mirrored data blocks, combinations of the foregoing, or the like. The location information may include, for example, node id, device, id, and address offset, though other location may be used.

C. Exemplary Metadata File Tree

Since the metadata includes location information for files and directories stored on the network 100, the distributed file system according to one embodiment uses a file tree comprising metadata data structures. For example, FIG. 2 illustrates an exemplary file tree 200 including metadata data structures referred to herein as "inodes." In this example, the inodes are protected against failures by mirroring the inodes such that the inodes are stored on two devices. Thus, if a device fails, an inode on the failed device can be recovered by reading a copy of the inode from a non-failing device. An artisan will recognize that the inodes can be mirrored on more than two devices, can be protected using a parity scheme, or can be protected using a combination of methods. In one embodiment, the inodes are protected using the same level of protection as the data to which the inodes point.

As illustrated in the example in FIG. 2, the file tree 200 includes an inode 202 corresponding to a "/" directory (e.g., root directory). Referring to FIG. 1, the inode 202 for the root directory is mirrored on device D and device H. The inode 202 for the root directory points to an inode 204 (stored on devices A and G) for a directory named "dir1," an inode 206 (stored on devices C and F) for a directory named "dir2," and an inode 208 (stored on devices B and E) for a directory named "dir3."

The inode 206 for directory dir2 points to an inode 210 (stored on devices D and G) for a directory named "dir4," an inode 212 (stored on devices B and C) for a directory named "dir5," an inode 214 (stored on devices A and E) for a directory named "dir6," and an inode 216 (stored on devices A and B) for a file named "file1.zzz." The inode 208 for directory dir3 points to an inode 218 (stored on devices A and F) for a file named "file2.xyz." The inode 214 for the directory dir6 points to an inode 220 (stored on devices A and C) for a file named "file3.xxx," an inode 222 (stored on devices B and C) for a file named "file4.xyz," and an inode 224 (stored on devices D and G) for a file named "file5.xyz." An artisan will recognize that the inodes shown in FIG. 2 are for illustrative purposes and that the file tree 200 can include any number inodes corresponding to files and/or directories and a variety of protection methods may be used.

Figure 2A:
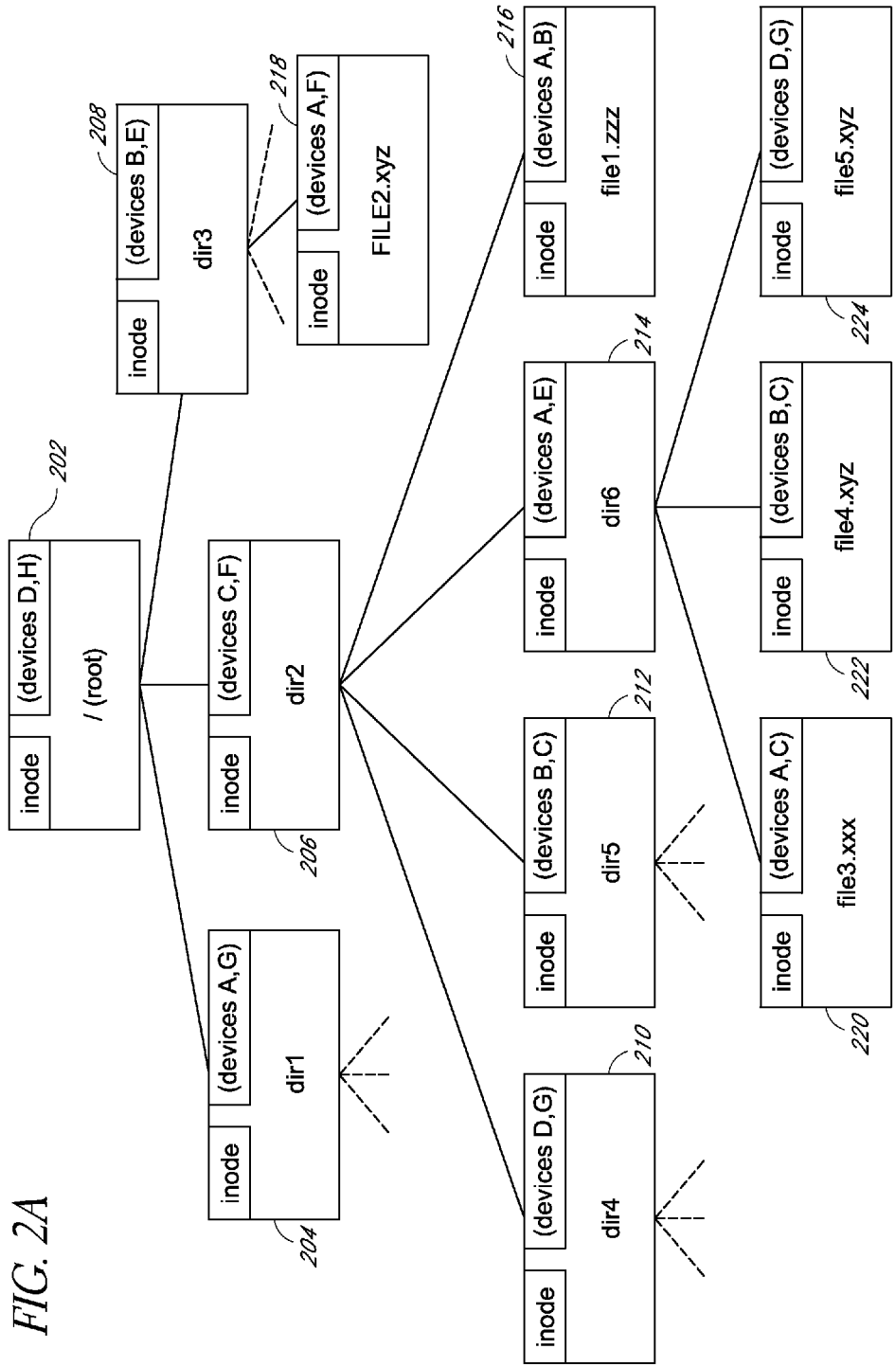
FIG. 2A illustrates an exemplary file tree including metadata data structures according to one embodiment.

FIG. 2A illustrates one embodiment of an inode map 230 and an inode storage 240 on Device A. The exemplary inode map 230 has multiple entries where the first entry 0 corresponds to inode storage entry 0, the second entry 1 corresponds to inode storage entry 1, and so forth. In the exemplary inode map 230, a 1 represents that an inode is storage in the corresponding inode storage 240, and a 0 represents that no inode is store in the corresponding inode storage 240. For example, inode map 230 entry 0 is 1, signifying that there is an inode stored in inode storage 240 entry 0. The inode for dir1 204 is stored in inode storage 0. Inode map 230 entry 1 is 0 signifying that there is no inode stored in inode storage 240 entry 1. The exemplary inode storage 240 of Device A stores inodes 204, 214, 216, 218, 220 in accordance with FIG. 2A.

D. Exemplary Metadata Data Structures

Figure 3:
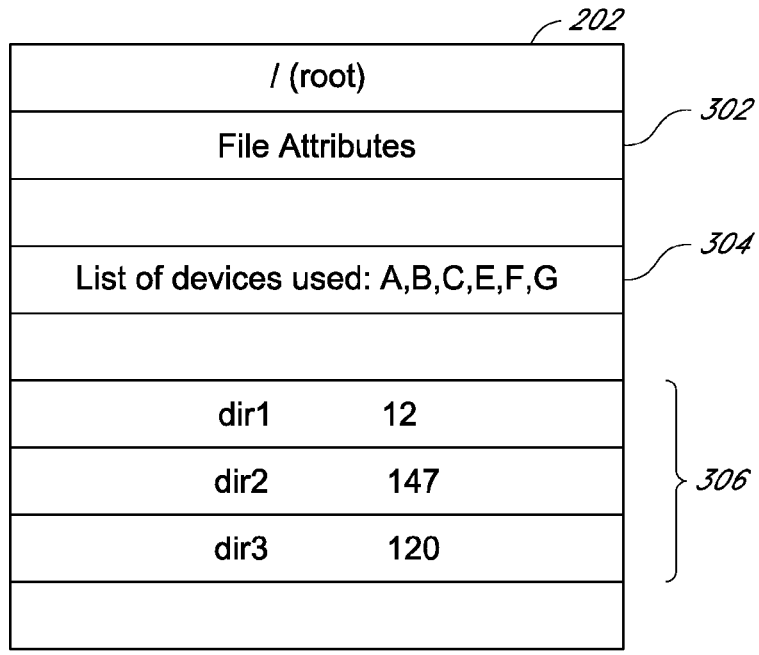
FIGS. 3-5 illustrate exemplary metadata data structures for directories according to certain embodiments.

In one embodiment, the metadata data structure (e.g., inode) includes, attributes and a list of devices having data to which the particular inode points. For example, FIG. 3 illustrates an exemplary metadata data structure of the inode 202 for the root directory. The inode 202 for the root directory includes attribute information 302 corresponding to the inode 202. As discussed above, the attribute information may include, for example, size, name, type (e.g., directory and/or root directory), creation time, access time, modification time, version, permission, parity scheme, location, combinations of the foregoing, and/or other information related to the root directory. In one embodiment, the nodes 102, 104, 106, 108, 110, 112 in the network 100 include predefined location information for accessing the inode 202 of the root directory on device D and/or device H. In other embodiments, the exemplary inode 202 includes location information (not shown) pointing to its location on devices D and H. The inode 202 for the root directory also includes a list of devices used 304. As shown in FIG. 2, since the inodes 204, 206, 208 for directories dir1, dir2, and dir3 are stored on devices A, B, C, E, F and G, these devices are included in the list of devices used 304.

The inode 202 for the root directory also includes location information 306 corresponding to the directories dir1, dir2, and dir3. As shown in FIG. 3, in one embodiment, the location information 306 includes unique identification numbers (e.g., logical inode numbers) used to match the directories dir1, dir2, and dir3 to the physical storage locations of the inodes 204, 206, 208, respectively. In certain such embodiments, the distributed file system includes a data structure that tracks the unique identification numbers and physical addresses (e.g., identifying the node, device, and block offset) of the inodes 204, 206, 208 on the distributed file system. As illustrated, unique identifiers are provided for each of the directories dir1, dir2, dir3 such that a data structure may be configured, for example, to match the unique identifiers to physical addresses where the inodes 204, 206, 208, and their mirrored copies are stored. In other embodiments, the location information 306 includes the physical addresses of the inodes 204, 206, 208 or the location information includes two unique identifiers for each of the directories dir1, dir2, and dir3 because the directories are mirrored on two devices. Various data structures that may be used to track the identification numbers are further discussed in U.S. patent application Ser. No. 11/255,818, titled "SYSTEMS AND METHODS FOR MAINTAINING DISTRIBUTED DATA," and U.S. patent application Ser. No. 11/255,337, titled "SYSTEMS AND METHODS FOR ACCESSING AND UPDATING DISTRIBUTED DATA," each referenced and incorporated by reference above.

Figure 4:
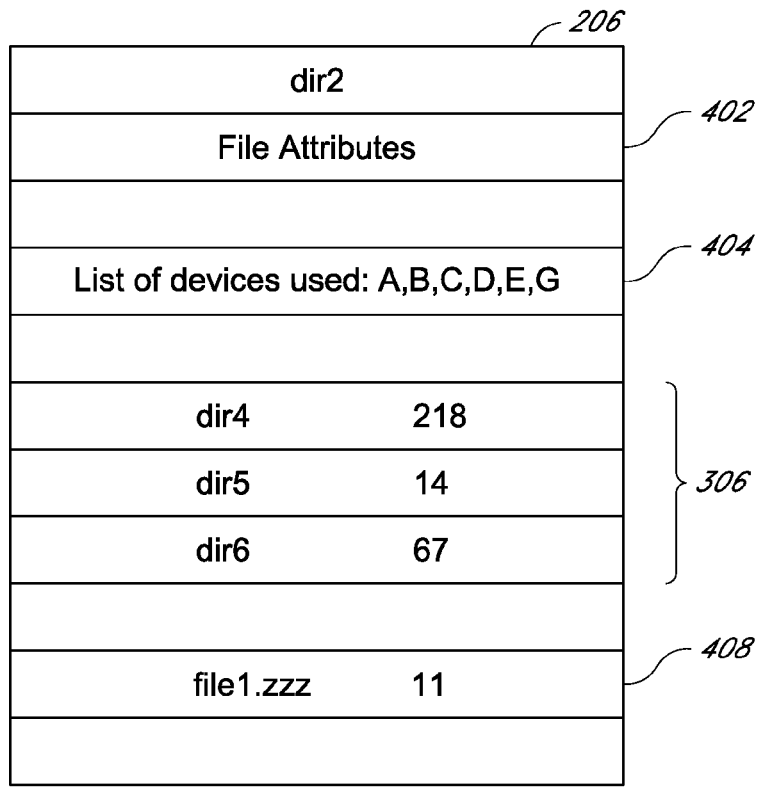

FIG. 4 illustrates an exemplary metadata data structure of the inode 206 for the directory dir2. As discussed above in relation to the inode 202 for the root directory, the inode 206 for the directory dir2 includes attribute information 402 corresponding to the inode 206 and a list of devices used 404. As shown in FIG. 2, the inode 216 for the file file1.zzz is stored on devices A and B. Further, the inodes 210, 212, 214 for the directories dir4, dir5, and dir6 are stored on devices A, B, C, D, E, and G. Thus, these devices are included in the list of devices used 404. The inode 206 for the directory dir2 also includes location information 406 corresponding to the directories dir4, dir5, dir6 and location information 408 corresponding to the file file1.zzz. As discussed above, the location information 406 points to the inodes 210, 212, 214 and the location information 408 points to the inode 216. Further, as discussed above, unique identifiers are provided for each of the directories dir4, dir5, dir6 and the file file1.zzz, however, other embodiments, as discussed above, may be used.

Figure 5:
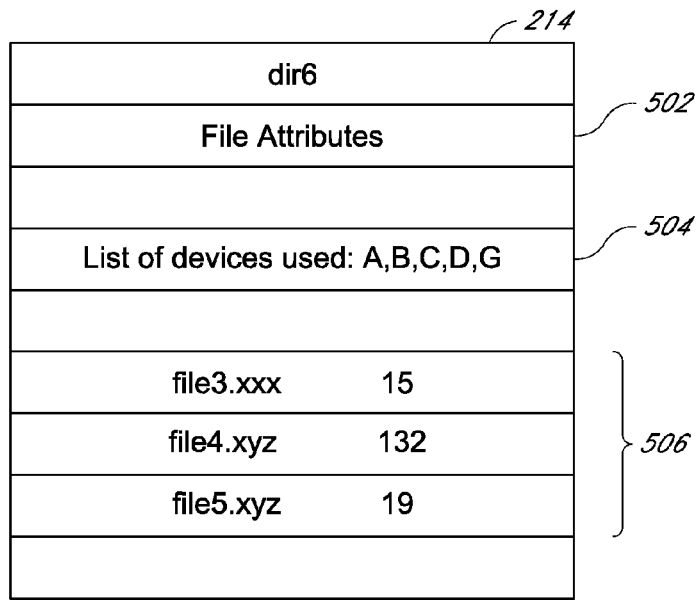

FIG. 5 illustrates an exemplary metadata data structure of the inode 214 for the directory dir6. As discussed above in relation to the inode 202 for the root directory, the inode 214 for the directory dir6 includes attribute information 502 corresponding to the inode 214 and a list of devices used 504. As shown in FIG. 2, the inodes 220, 222, 224 for the files are stored on devices A, B, C, D, and G. Thus, these devices are included in the list of devices used 504. The inode 214 for the directory dir6 also includes location information 506 corresponding to the files file3.xxx, file4.xyz, and file5.xyz. As discussed above, the location information 506 points to the inodes 220, 222, 224. Further, as discussed above, unique identifiers are provided for each of the files file3.xxx, file4.xyz, and file5, however, other embodiments, as discussed above, may be used.

Figure 6:
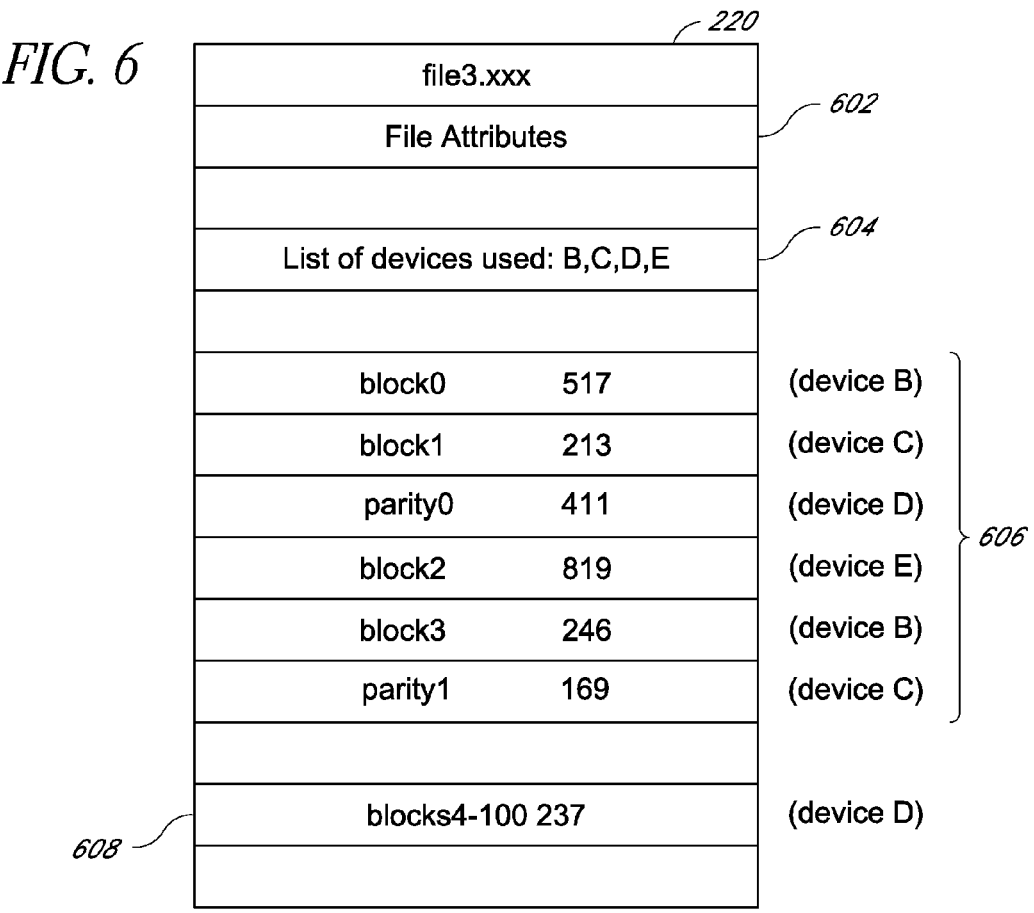
FIG. 6 illustrates an exemplary metadata data structure for a file according to one embodiment.

FIG. 6 illustrates an exemplary metadata data structure of the inode 220 for the file file3.xxx. The inode 220 for the file file3.xxx includes attribute information 602 corresponding to the inode 220. For example, the attribute information 602 may include the size of file3.xxx, the name of file3.xxx (e.g., file3), the file type, the file extension (e.g., .xyz), the file creation time, the file access time, the file modification time, the file version, the file permissions, the file parity scheme, the file location, combinations of the foregoing, or the like.

The inode 220 also includes a list of devices used 604. In this example, content data blocks and parity data blocks corresponding to the file file3.xxx are striped across devices B, C, D, and E using a 2+1 parity scheme. Thus, for two blocks of content data stored on the devices B, C, D, and E, a parity data block is also stored. The parity groups (e.g., two content data blocks and one parity data block) are distributed such that each block in the parity group is stored on a different device. As shown in FIG. 6, for example, a first parity group may include a first content data block (block0) stored on device B, a second content data block (block1) stored on device C, and a first parity block (parity0) stored on device D. Similarly, a second parity group may include a third content data block (block2) stored on device E, a fourth content data block (block3) stored on device B and a second parity data block (parity1) stored on device C.

The inode 220 for the file file3.xxx also includes location information 606 corresponding to the content data blocks (e.g., block0, block1, block2, and block3) and parity data blocks (e.g., parity0 and parity1). As shown in FIG. 6, in one embodiment, the location information 606 includes unique identification numbers (e.g., logical block numbers) used to match the content data blocks and parity data blocks to the physical storage locations of the respective data. In certain such embodiments, the distributed file system includes a table that tracks the unique identification numbers and physical addresses (e.g., identifying the node, device, and block offset) on the distributed file system. In other embodiments, the location information 606 includes the physical addresses of the content data blocks and parity data blocks. In one embodiment, the inode 220 for the file file3.xxx also includes location information 608 corresponding to one or more metadata data blocks that point to other content data blocks and/or parity blocks for the file file3.xxx.

III. Scanning Distributed File Systems

In one embodiment, the distributed file system is configured to scan a portion or all of the files and/or directories in the distributed file system by commanding nodes to search their respective metadata for a selected attribute. As discussed in detail below, the nodes can then search their respective metadata in parallel and perform an appropriate action when metadata is found having the selected attribute.

Commanding the nodes to search their respective metadata in parallel with other nodes greatly reduces the amount of time necessary to scan the distributed file system. For example, to read a file in path /dir1/fileA.xxx of a file tree (where "/" is the top level or root directory and "xxx" is the file extension of the file named fileA in the directory named dir1), the file system reads the file identified by the root directory's predefined unique identification number, searches the root directory for the name dirt, reads the file identified by the unique identification number associated with the directory dirt, searches the dir1 directory for the name fileA.xxx, and reads the file identified by the unique identification number associated with fileA.xxx.

For example, referring to FIG. 2A, sequentially traversing the file tree 200 may include reading the inode 202 corresponding to the root directory to determine the names and locations of the inodes 204, 206, 208. Then, the inode 204 corresponding to the directory dir1 may be read to determine the names and locations of any subdirectories and files that the inode 204 may point to.

After sequentially stepping through the subdirectory and file paths of the directory dirt, the inode 206 corresponding to the directory dir2 may be read to determine the names and locations of the subdirectories (e.g., dir4, dir5, and dir6) and files (e.g., file1.zzz) that the inode 206 points to. This process may then be repeated for each directory and subdirectory in the distributed file system. Since content data, metadata and parity data is spread throughout the nodes 102, 106, 108, 110, 112 in the network 100, sequentially traversing the file tree 200 requires a large number of messages to be sent between the nodes and uses valuable system resources. Thus, sequentially traversing the file tree 200 is time consuming and reduces the overall performance of the distributed file system.

However, commanding the nodes 102, 106, 108, 110, 112 to search their respective metadata in parallel, according to certain embodiments disclosed herein, reduces the number of messages sent across the network 100 and allows the nodes 102, 106, 108, 110, 112 to access their respective devices A-H sequentially.

In one embodiment, for example, one or more of the devices A-H are hard disk drives that are capable of operating faster when accessed sequentially. For example, a disk drive that yields approximately 100 kbytes/second when reading a series of data blocks from random locations on the disk drive may yield approximately 60 Mbytes/second when the data blocks are read from sequential locations on the disk drive. Thus, allowing the nodes 102, 106, 108, 110, 112 to respectively access their respective drives sequentially, rather than traversing an overall file tree for the network 100 (which repeatedly accesses small amounts of data scattered across the devices A-H), greatly reduces the amount of time used to scan the distributed file system.

The nodes 102, 106, 108, 110, 112 may perform additional processing, but the additional work is spread across the nodes 102, 106, 108, 110, 112 and reduces overall network traffic and processing overhead. For example, in one embodiment, rather than reading all the metadata from the node 102 across the network, the node 102 searches its metadata and only the metadata satisfying the search criteria is read across the network. Thus, overall network traffic and processing overhead is reduced.

Figure 7:
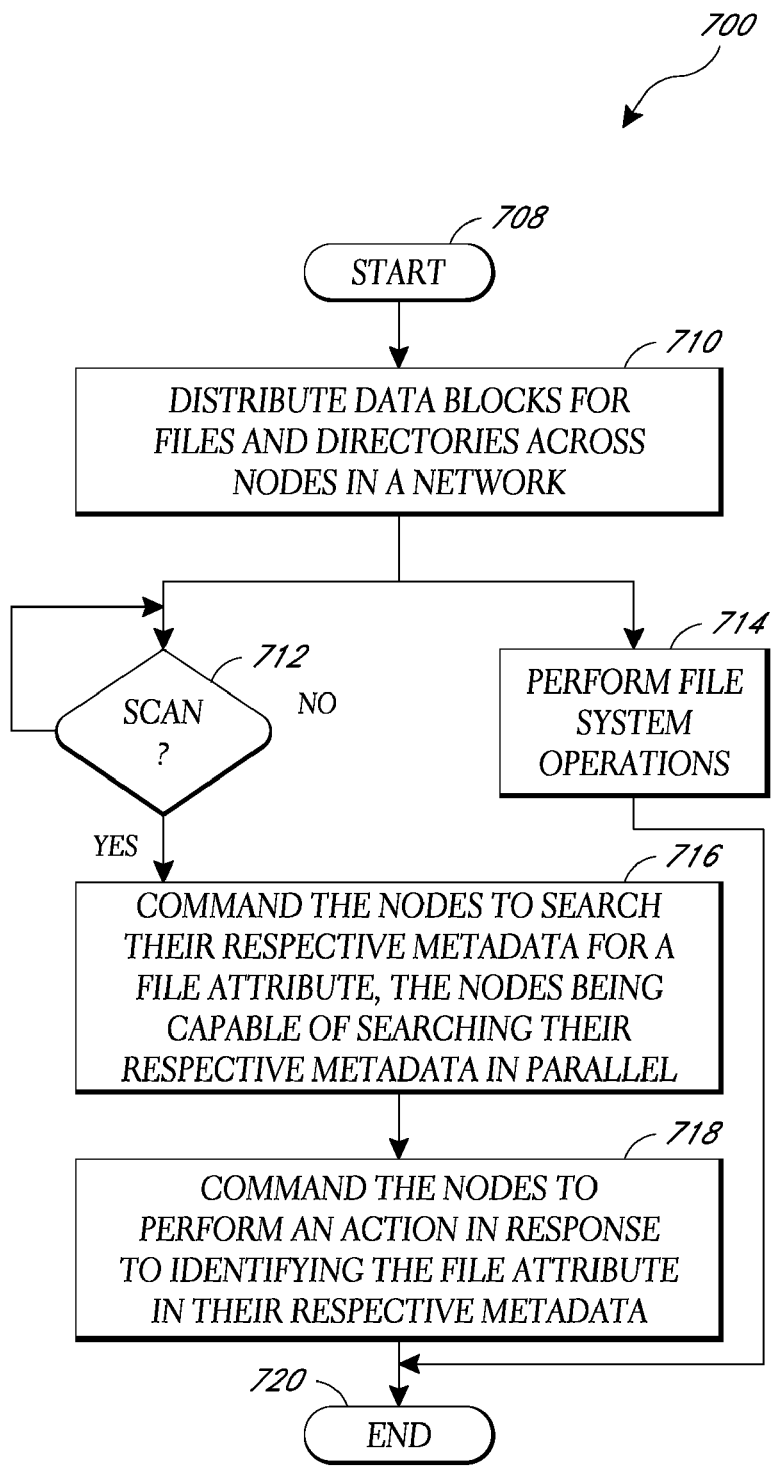
FIG. 7 is a flow chart of a process for scanning files and directories in a distributed file system according to one embodiment.

FIG. 7 is a flow chart of one embodiment of a process 700 for scanning files and directories in a distributed file system according to one embodiment. Beginning at a start state 708, the process 700 proceeds to block 710. In block 710, the process 700 includes distributing content data blocks, metadata blocks and protection data blocks (e.g., parity data, and mirrored data) for files and directories across nodes in a network. For example, as discussed in detail above, content data blocks, metadata data blocks and protection data blocks are stored in nodes 102, 106, 108, 110, 112 in the network 100 shown in FIG. 1. The metadata data blocks include attribute information corresponding to files and directories stored on the network 100. The attribute information may include, for example, file size, file name, file type, file extension, file creation time (e.g., time and date), file access time (e.g., time and date), file modification date (e.g., time and date), file version, file permission, file parity scheme, file location, combinations of the foregoing, or the like.

From the block 710, the process 700 proceeds, in parallel, to blocks 712 and 714. In the block 714, file system operations are performed. The file system operations may include, for example, continuing to distribute data blocks for files and directories across the nodes in the network, writing files, reading files, restriping files, repairing files, updating metadata, waiting for user input, and the like. The distributed file system operations can be performed while the system waits for a command to scan and/or while the distributed file system performs a scan as discussed below.

In the block 712, the system queries whether to scan the distributed file system to identify the files and directories having a selected attribute. For example, the distributed file system or a user of the network 100 shown in FIG. 1 may want to search for files and/or directories created or modified in a certain range of dates and/or times, files that have not been accessed for a certain period of time, files that are of a certain type, files that are a certain size, files with data stored on a particular memory device (e.g., a failed memory device), files that have other particular attributes, or combinations of the foregoing. While the system performs the other file system operations in the block 714, the system continues to scan the distributed file system. In one embodiment, a scan will not be performed, for example, if a user has not instructed the distributed file system to scan, or the distributed file system has not determined that a scan is needed or desired (e.g., upon detecting that a node has failed).

If a scan is desired or needed, the process 700 proceeds to a block 716 where the distributed file system commands the nodes to search their respective metadata data blocks for a selected attribute. Advantageously, the nodes are capable of searching their metadata data blocks in parallel with one another. For example, the nodes 102, 106, 108, 110, 112 may each receive the command to search their respective metadata data blocks for the selected attribute. The nodes 102, 106, 108, 110, 112 can then execute the command as node resources become available. Thus, rather than waiting for each node 102, 106, 108, 110, 112 to scan its respective metadata data blocks one at a time, two or more of the nodes 102, 106, 108, 110, 112 that have sufficient node resources may search their respective metadata data blocks at the same time. It is recognized that the distributed file system may command a subset of the nodes to conduct the search.

In one embodiment, the metadata data blocks for a particular node are sequentially searched for the selected attribute. For example, a node may include a drive that is divided into a plurality of cylinder groups. The node may sequentially step through each cylinder group reading their respective metadata data blocks. In other embodiments, metadata data blocks within a particular node are also searched in parallel. For example, the node 108 includes devices C and D that can be searched for the selected attribute at the same time. The following exemplary pseudocode illustrates one embodiment of accessing metadata data blocks (e.g., stored in data structures referred to herein as inodes) in parallel:

```
for all devices (in parallel);
    for each cylinder group;
        for each inode with bit in map = 1;
            read inode.
```

In a block 718, the distributed file system commands the nodes to perform an action in response to identifying the selected attribute in their respective metadata and proceeds to an end state 720. An artisan will recognize that the command to search for the selected attribute and the command to perform an action in response to identifying the selected attribute can be sent to the nodes using a single message (e.g., sent to the nodes 102, 106, 108, 110, 112) or using two separate messages. The action may include, for example, writing data, reading data, copying data, backing up data, executing a set of instructions, and/or sending a message to one or more of the other nodes in the network. For example, the node 102 may find one or more its inodes that point to files or directories created within a certain time range. In response, the node 102 may read the files or directories and write a backup copy of the files or directories.

In one embodiment, the action in response to identifying the attribute includes sending a list of unique identification numbers (e.g., logical inode number or "LIN") for inodes identified as including the selected attribute to one or more other nodes. For example, the nodes 102, 106, 108, 110, 112 may send a list of LINs for their respective inodes with the selected attribute to one of the other nodes in the network 100 for processing. The node that receives the LINs may or may not have any devices. For example, the node 104 may be selected to receive the LINs from the other nodes 102, 106, 108, 110, 112 and to perform a function using the LINs.

After receiving the LINs from the other nodes 102, 106, 108, 110, 112, the node 104 reads the inodes identified by the LINs for the location of or pointers to content data blocks, metadata data blocks, and/or protection data blocks (e.g., parity data blocks and mirrored data blocks). In certain such embodiments, the node 104 also checks the identified inodes to verify that they still include the selected attribute. For example, the selected attribute searched for may be files and directories that have not been modified for more than 100 days and the node 104 may be configured to delete such files and directories. However, between the time that the node 104 receives the list of LINs and the time that the node 104 reads a particular identified inode, the particular identified inode may be updated to indicate that its corresponding file or directory has recently been modified. The node 104 then deletes only files and directories with identified inodes that still indicate that they have not been modified for more than 100 days.

While process 700 illustrates an embodiment for scanning files and directories in a distributed file system such that all devices are scanned in parallel, it is recognized that the process 700 may be used on a subset of the devices. For example, one or more devices of the distributed file system may be offline. In addition, the distributed file system may determine that the action to be performed references only a subset of the devices such that only those devices are scanned, and so forth.

A. Example Scan Transactions

High-level exemplary transactions are provided below that illustrate scanning a distributed file system according to certain embodiments. The exemplary transactions include a data backup transaction and a failure recovery transaction. An artisan will recognize from the disclosure herein that many other transactions are possible.

1. Example Data Backup Transaction

The following example illustrates how backup copies of information stored on the network 100 can be created by scanning the distributed file system to find files and directories created or modified during a certain time period (e.g., since the last backup copy was made). In this example, the node 104 is selected to coordinate the backup transaction on the distributed file system. An artisan will recognize, however, that any of the nodes can be selected to coordinate the backup transaction.

The node 104 begins the backup transaction by sending a command to the nodes 102, 106, 108, 110, 112 to search their respective metadata so as to identify inodes that point to files and directories created or modified within a certain time range. As discussed above, the exemplary nodes 102, 106, 108, 110, 112 are capable of searching their metadata in parallel with one another. After searching, the nodes 102, 106, 108, 110, 112 each send a list of LINs to the node 104 to identify their respective inodes that point to files or directories created or modified within the time range. The node 104 then accesses the identified inodes and reads locations of or pointers to content data blocks, metadata blocks, and/or protection data blocks corresponding to the files or directories created or modified within the time range. The node 104 then writes the content data blocks, metadata blocks, and/or protection data blocks to a backup location.

2. Example Failure Recovery Transaction

Figure 8:
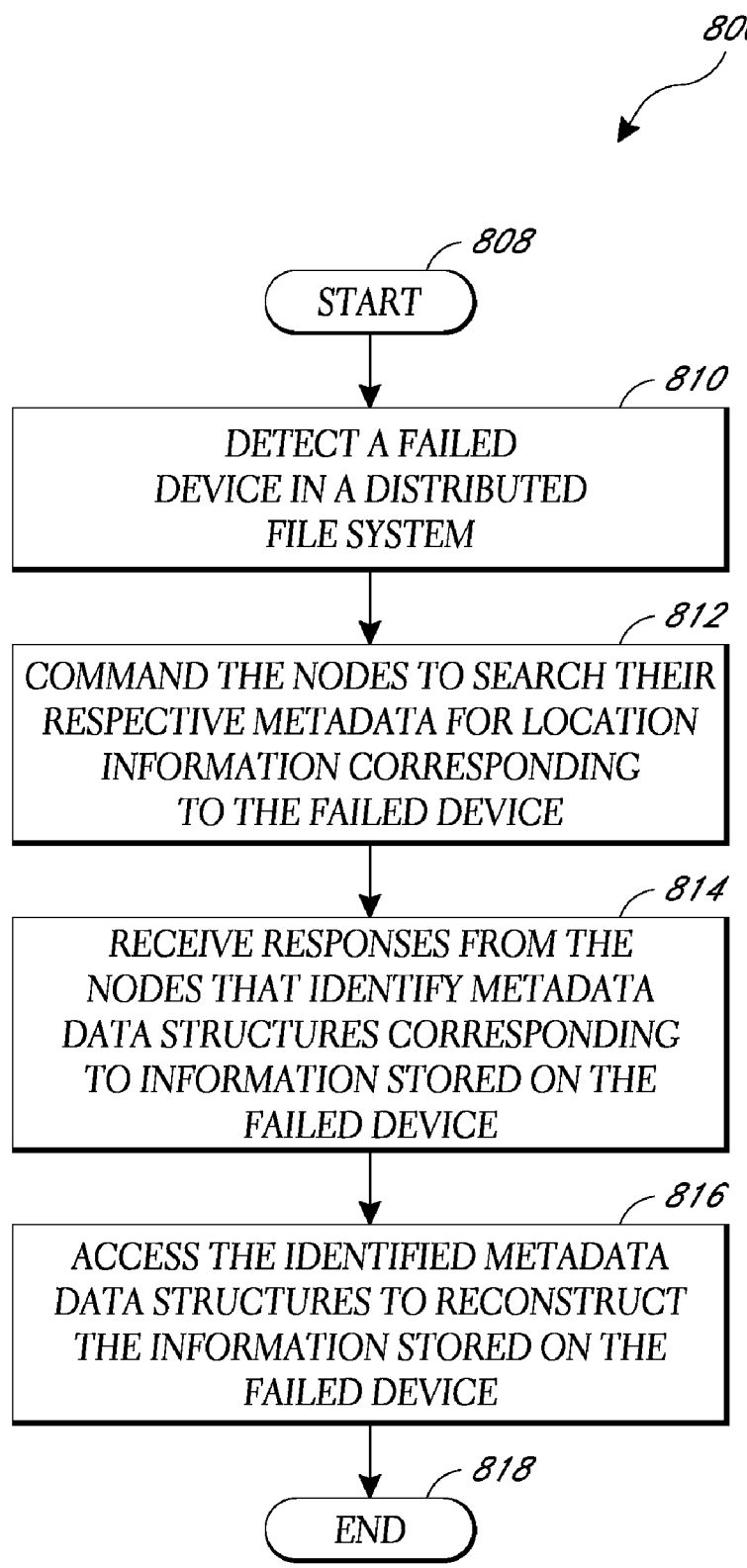
FIG. 8 is a flow chart of a process for recovering from a failure in a distributed file system according to one embodiment.

FIG. 8 is a flow chart of a process 800 for recovering from a failure in a distributed file system according to one embodiment. Failures may include, for example, a loss of communication between two or more nodes in a network or the failure of one or more memory devices in a node. For illustrative purposes, device B in the node 106 shown in FIG. 1 is assumed to have failed. However, an artisan will recognize that the process 800 can be used with other types of failures or non-failures. For example, the process 800 can be modified slightly to replace or upgrade a node or memory device that has not failed.

Beginning at a start state 808, the process 800 proceeds to block 810. In block 810, the process 800 detects a failed device in a distributed file system. For example, in one embodiment, the nodes 102, 106, 108, 110, 112 include a list of their own devices and share this list with the other nodes. When a device on a node fails, the node notifies the other nodes of the failure. For example, when device B fails, the node 106 sends a message to the nodes 102, 104, 108, 110, 112 to notify them of the failure.

In a block 812, the process 800 includes commanding the nodes to search their respective metadata for location information corresponding to the failed device. In one embodiment, the message notifying the nodes 102, 106, 108, 110, 112 of the failure of the device B includes the command to search for metadata identifies the location of content data blocks, metadata data blocks, and protection data blocks (e.g., parity data blocks and mirrored data blocks) that are stored on the failed device B.

After receiving the command to search metadata for location information corresponding to the failed device B, the nodes 102, 108, 110, 112 begin searching for inodes that include the failed device B in their list of devices used. For example, as discussed above in one embodiment, the inode 202 for the root directory is stored on devices D and H and includes the location of or pointers to the inodes 204, 206, 208 for the directories dir1, dir2 and dir3, respectively (see FIG. 2). Since a copy of the inode 208 for the directory dir3 is stored on the failed device B, the inode 202 for the root directory includes device B in its list of devices used 304 (see FIG. 3). Thus, the nodes 108 (for device D) and 112 (for device H) will include the LIN for the inode 202 in their respective lists of LINs that meet the search criteria. The following exemplary pseudocode illustrates one embodiment of generating a list of LINs for inodes that meet the search criteria:

```
for each allocated inode:
    read allocated inode;
    if needs_restripe (e.g., a portion of a file, a directory or
        subdirectory, or a copy of the inode is located on the failed
        device B);
            return LIN.
```

Similarly, the nodes 108 (for device C) and 110 (for device F) will include the LIN for the inode 206 in their respective lists of LINS that meet the search criteria, the nodes 102 (for device A) and 110 (for device E) will include the LIN for the inode 214 in their respective lists of LINS that meet the search criteria, and the nodes 102 (for device A) and 108 (for device C) will include the LIN for the inode 220 in their respective lists of LINs that meet the search criteria. While this example returns the LIN of the inode, it is recognized that other information may be returned, such as, for example, the LIN for inode 208. In other embodiments, rather than return any identifier, the process may initiate reconstruction of the data or other related actions.

In other embodiments, the list of devices used for a particular inode includes one or more devices on which copies of the particular inode are stored. For example, FIG. 2A shows that the inode 208 is stored on devices B and E. The copy of the inode 208 on device E will list device B as used. Also, the node 110 (for device E) will include the LIN for the inode 208 in its list of LINs that meet the search criteria. Similarly, the device 102 (for device A) will include the LIN for the inode 216 in its list of LINs that meet the search criteria, and the node 108 (for device C) will include the LIN for inodes 212 and 222.

As discussed above, the nodes 102, 108, 110, 112 are capable of searching their respective metadata in parallel with one another. In one embodiment, the nodes 102, 108, 110, 112 are also configured to execute the command to search their respective metadata so as to reduce or avoid interference with other processes being performed by the node. The node 102, for example, may search a portion of its metadata, stop searching for a period of time to allow other processes to be performed (e.g., a user initiated read or write operation), and search another portion of its metadata. The node 102 may continue searching as the node's resources become available.

In one embodiment, the command to search the metadata includes priority information and the nodes 102, 108, 110, 112 are configured to determine when to execute the command in relation to other processes that the nodes 102, 108, 110, 112 are executing. For example, the node 102 may receive the command to search its metadata for the location information as part of the overall failure recovery transaction and it may also receive a command initiated by a user to read certain content data blocks. The user initiated command may have a higher priority than the command to search the metadata. Thus, the node 102 will execute the user initiated command before searching for or completing the search of its metadata for the location information corresponding to the failed device B.

In one embodiment, the nodes 102, 108, 110, 112 are configured to read their respective inodes found during the search and reconstruct the lost data (as discussed below) that the inodes point to on the failed device B. In the embodiment shown in FIG. 8, however, the nodes 102, 108, 110, 112 are configured to send their respective lists of LINs that meet the search criteria to one or more of the nodes 102, 104, 106, 108, 110, 112 that has the responsibility of reconstructing the data and restriping files across the distributed file system.

In a block 814, the process 800 includes receiving responses from the nodes that identify metadata data structures corresponding to information stored on the failed device. For example, the nodes 102, 108, 110 may send their lists of LINs to the node 112. In a block 816, the process 800 includes accessing the identified metadata data structures to reconstruct the lost information stored on the failed device and proceeds to an end state 818. For example, after receiving the lists LINs from the nodes 102, 108, 110, the node 112 may use the received LINs and any LINs that it has identified to read the corresponding inodes to determine the locations of content data blocks, metadata blocks and protection data blocks corresponding to the lost information on the failed device B.

For example, as discussed above, the node 112 in one embodiment may receive lists of LINs from the nodes 108 and 112 that include the LIN for the inode 202. The node 112 then reads the inode 202 from either the device D or the device H to determine that it includes pointers to the inode 208 for the directory dir3 stored on the failed device B (see FIG. 3). From the inode 202, the node 112 also determines that a mirrored copy of the inode 208 is stored on device E. Thus, the node 112 can restore the protection scheme of the inode 208 (e.g., maintaining a mirrored copy on another device) by reading the inode 208 from the device E and writing a copy of the inode 208 to one of the other devices A, C, D, F, G, H.

As another example, the node 112 also receives lists of LINs from the nodes 102 and 108 that include the LIN for the inode 220. The node 112 then reads the inode 220 from either the device A or the device C for the location of or pointers to content data blocks (block0 and block3) stored on the failed device B (see FIG. 6). In certain embodiments, the node 12 also verifies that the file3.xxx has not already been restriped such that block0 and block3 have already been recovered and stored on another device. For example, between the time that the node 112 receives the LIN for the inode 220 and the time that the node 112 reads the inode 220, the distributed file system may have received another command to restripe the file3.xxx.

As discussed above, the file3.xxx uses a 2+1 parity scheme in which a first parity group includes block0, block1 and parity0 and a second parity group includes block2, block3, and parity1. If needed or desired, the node 112 can recover the block0 information that was lost on the failed device B by using the pointers in the inode 220 to read the block 1 content data block and the parity0 parity data block, and XORing block1 and parity0. Similarly, the node 112 can recover the block3 information that was lost on the failed device B by using the pointers in the inode 220 to read the block2 content data block and the parity1 parity data block, and XORing block2 and parity1. In one embodiment, the node 112 writes the recovered block0 and block3 to the remaining devices A, C, D, E F, G, H. In another embodiment, the node 112 can then change the protection scheme, if needed or desired, and restripe the file file3.xxx across the remaining devices A, C, D, E, F, G, H.

Thus, the distributed file system can quickly find metadata for information that was stored on the failed device B. Rather than sequentially traversing the entire file tree 200, the distributed file system searches the metadata of the remaining nodes 102, 108, 110, 112 in parallel for location information corresponding to the failed device B. This allows the distributed file system to quickly recover the lost data and restripe any files, if needed or desired.

IV. Conclusion

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for handling a failure in a distributed file system, the method comprising:
   for at least one file of a plurality of files, storing a the file across one or more memory devices of a plurality of nodes in a network, at least some of the files distributed in blocks across multiple nodes;
   creating a data block location information structure associated with the file and listing, for all of the blocks in the file, the memory devices and physical addresses where the blocks are stored;
   creating a consolidated device list which is associated with the file and which comprises an abbreviated listing of each of the one or more memory devices that are listed in the data block location information structure, but which does not include a duplicate listing of a particular memory device for all of the blocks in the file that are stored on the particular memory device, wherein the device list is separate from and includes less information than the data block location information structure;
   storing metadata data structures across the plurality of nodes, at least two of the metadata data structures stored on different nodes, each of the metadata data structures referencing information about a corresponding one of the plurality of files, and the metadata data structures comprising the data block location information structure and the consolidated device list of the corresponding file;
   detecting that one of the memory devices in the network has failed;
   using one or more processors, commanding the nodes to search each consolidated device list stored in each of their respective metadata data structures to determine whether the failed memory device is used to store information referenced by their respective metadata data structures, wherein searching each consolidated device list allows the nodes to make the determination without searching through the data block location information structure, which includes more information than the consolidated device list; and
   receiving an indication from the nodes of which metadata data structures reference information stored on the failed device.

2. The method of claim 1, further comprising commanding the nodes to access the identified metadata data structures to reconstruct the information stored on the failed device.

3. The method of claim 1, wherein the files comprise files and directories.

4. The method of claim 1, wherein at least some of the nodes perform at least a portion of the search of the consolidated lists of their respective metadata data structures in parallel with at least a portion of the search of one or more other nodes.

5. The method of claim 1, wherein accessing the identified metadata data structures comprises reading pointers to at least one of file content blocks, metadata data blocks, and protection data blocks stored on the failed memory device.

6. The system of claim 1, wherein the consolidated device list includes a single reference to each of the one or more memory devices that is listed in the data block location information structure, regardless of the number of blocks of the associated file that are stored on the particular memory device.

7. A distributed file system, comprising:
   a plurality of nodes in a network, each comprising:
      one or more processors; and
      at least one memory device, wherein:
         a plurality of files is stored across the memory devices of the plurality of nodes, at least some of the files distributed in blocks across multiple nodes, and
         metadata data structures are stored across the memory devices of the plurality of nodes, at least two of the metadata data structures stored on different nodes, each of the metadata data structures referencing information about a corresponding one of the files, and the respective metadata data structures comprising:
            a data block location information structure associated with the file corresponding to the respective metadata data structure and listing, for all of the blocks in the file, the memory devices and physical addresses where the blocks in the file are stored; and
            a consolidated device list associated with the file corresponding to the respective metadata data structure and which comprises an abbreviated listing of each of one or more memory devices that are listed in the data block location information structure, wherein the consolidated device list does not include a duplicate listing of a particular memory device for all of the blocks in the file that are stored on the particular memory device, and is separate from and includes less information than the data block location information structure; and
   wherein the one or more processors of at least one of the nodes are configured to:
      detect that one of the memory devices in the network has failed;
      command the nodes to search each consolidated device list stored in each of their respective metadata data structures to determine whether the failed memory device is used to store information referenced by their respective metadata data structures, wherein searching each consolidated device list allows the nodes to make the determination without searching through the data block location information structure, which includes more information than the consolidated device list; and
      receive an indication from the nodes of which metadata data structures reference information stored on the failed device.

8. The system of claim 7, wherein the one or more processors of the at least one of the nodes are further configured to command the nodes to access the identified metadata data structures to reconstruct the information stored on the failed device.

9. The system of claim 7, wherein the files comprise files and directories.

10. The system of claim 7, wherein at least some of the nodes perform at least a portion of the search of the consolidated lists of their respective metadata data structures in parallel with at least a portion of the search of one or more other nodes.

11. The system of claim 7, wherein the nodes are configured to access the identified metadata data structures at least in part by reading pointers to at least one of file content blocks, metadata data blocks, and protection data blocks stored on the failed memory device.

12. The system of claim 7, wherein the consolidated device lists each include a single reference to each one or more memory devices that is listed in the corresponding data block location information structure, regardless of the number of blocks of the associated file that are on the particular memory device.

* * * * *

UNITED STATES PATENT AND TRADEMARK OFFICE
CERTIFICATE OF CORRECTION

PATENT NO. : 8,214,334 B2  Page 1 of 1
APPLICATION NO. : 12/837439
DATED : July 3, 2012
INVENTOR(S) : Mikesell et al.

It is certified that error appears in the above-identified patent and that said Letters Patent is hereby corrected as shown below:

On the Title Page

In column 1 (page 5 item 56) at line 39, Under Other Publications, change "Palto" to --Palo--.

In column 1 (page 6 item 56) at line 11, Under Other Publications, after "in" delete "in".

In column 1 (page 6 item 56) at line 25, Under Other Publications, after "in" delete "in".

In the Specifications

In column 8 at line 66, Change "dirt," to --dir 1--.

In column 9 at line 1, Change "dirt," to --dir 1--.

In column 9 at line 12, Change "dirt," to --dir 1--.

In the Claims

In column 15 at line 14, In Claim 1, change "a the" to --the--.

Signed and Sealed this
Twenty-eighth Day of May, 2013

Teresa Stanek Rea
*Acting Director of the United States Patent and Trademark Office*